United States Patent [19]

Yoshimura

[11] Patent Number: 5,088,907

[45] Date of Patent: Feb. 18, 1992

[54] SCREW ROTOR FOR OIL FLOODED SCREW COMPRESSORS

[75] Inventor: Shoji Yoshimura, Kakogawa, Japan

[73] Assignee: Kabushiki Kaisha Kobe Seiko Sho, Kobe, Japan

[21] Appl. No.: 549,106

[22] Filed: Jul. 6, 1990

[51] Int. Cl.⁵ ............................................. F04C 18/16
[52] U.S. Cl. ................................................ 418/201.3
[58] Field of Search ......................... 418/201.2, 201.3

[56] References Cited

U.S. PATENT DOCUMENTS

| | | | |
|---|---|---|---|
| 3,423,017 | 1/1969 | Schibbye | 418/201.3 |
| 4,576,558 | 3/1986 | Tanaka et al. | 418/201.3 |
| 4,679,996 | 7/1987 | Tanaka et al. | 418/201.3 |

FOREIGN PATENT DOCUMENTS

| | | |
|---|---|---|
| 56-17559 | 4/1981 | Japan . |
| 60-153486 | 8/1985 | Japan . |
| 60-41238 | 9/1985 | Japan . |

*Primary Examiner*—Richard A. Bertsch
*Assistant Examiner*—David L. Cavanaugh
*Attorney, Agent, or Firm*—Oblon, Spivak, McClelland, Maier & Neustadt

[57] ABSTRACT

Described herein are a couple of female and male screw rotors suitable for use in an oil cooled compressor or the like, the female rotor having a tooth of a profile containing on the trailing side thereof a first tooth surface expressed by a function f(x), generated by a tip end portion located on the trailing side of the opposing male rotor tooth and expressed by an arbitrary function F(x), and a second tooth surface expressed by a function G(x) and extending from the first tooth surface of the function f(x) to the addendum circle of the female rotor tooth, the second tooth surface being profiled in a different shape from the first tooth portion f(x) and having the center of curvature in part thereof located outward of the addendum circle of the female rotor tooth on the anterior side thereof.

1 Claim, 5 Drawing Sheets

SCREW ROTOR FOR OIL FLOODED SCREW COMPRESSORS

BACKGROUND OF THE INVENTION

1. Field of the Invention

This invention relates to screw rotor construction for use in oil flooded screw compressors to be applied to oil cooled equipments such as screw compressors, vacuum pumps, inflaters or the like.

2. Prior Art

In determining the tooth profiles of screw rotors of an oil flooded screw compressor, namely, the tooth profiles of flank portions on the trailing sides of rotors in the direction of rotation indicated by arrows in FIG. 5, it has been the general practice to determine firstly a suitable function F(x) which expresses the tooth profile of the tip end on the trailing side of a male rotor 11. Once the function F(x) is determined, there is automatically obtained a function f(x) which expresses the tooth profile on the trailing side of a female rotor 12 as generated by the tip end of the male rotor 11. Nextly, a suitable function G(x) which expresses the tooth profile of the female rotor 12 from the surface of the function f(x) to its addendum circle 13 is determined. This function G(x) automatically determines the function g(x) of the surface on the trailing side of the male rotor 11, which is generated by the female rotor profile of the function G(x).

The surface of the function G(x) has its center of curvature located either on the trailing side (Japanese Patent publications 60-41238 and 56-17559) or on the pitch circle on the trailing side (Japanese Laid-Open Patent Application 60-153486).

The tooth profiles on the trailing sides of screw rotors have great influences on the performance quality of a screw compressor or the like, and are desired to be small in seal line length and blow hole area.

However, as shown in FIGS. 5 through 9, the seal line length and blow hole area are contradictory to each other in nature, namely, they are in the relationship that one is increased by reduction of the other.

The broken lines in FIG. 5 indicate the loci of a seal point between the rotor tooth surfaces of the functions F(x) and f(x) and a seal point between the rotor tooth surfaces of the functions G(x) and g(x), which are draw in when the female and male rotors 12 and 11 are rotated in the directions indicated by the arrows in the figure. Namely, as the rotors are rotated, the seal point between the rotor tooth surfaces of the functions F(x) and f(x) is shifted from point B to point A, while the seal point between the rotor tooth surfaces of the functions G(x) and g(x) is shifted from point B to point C. Point C, which is located on addendum circle 13 of the female rotor, is the last point of contact between the rotor tooth surfaces G(x) and g(x). Indicated at 15 and 14 are pitch circles of the female and male rotors 12 and 11, respectively.

Shown in FIG. 6 is the relationship of the rotational angle $\phi$ of the rotors from a reference point, namely, from point A where the seal point between the rotor tooth surfaces of the functions F(x) and f(x) is located on a line which connects the centers of the two rotors, or of the distance of the seal point from the reference point in the axial direction of the rotors, with the distance of the locus of displacement of the seal point from the reference point as measured on the plane xy, that is, on the plane of the drawing. Points a and c in FIG. 6 correspond to the points of large letters A and C in FIG. 5, and point b corresponds to the point of the larger letter B. The length of the seal line is equivalent to the length of the curves ab and cb in FIG. 6, and determined mostly by the location of the point B. The point B in FIG. 5 can be shifted to position B' by reducing the distance between point E (the point at which f(x) meets G(x) and the center of the female rotor $O_F$. Since B' is closer to the point A than Point B, the point b in FIG. 6 is shifted to point b' as indicated by one-dot chain line to form a shortened seal line. In FIG. 6, the reference characters $\phi_B$ and $\phi_{B'}$ indicate the rotational angles of the rotors at points B and B', respectively, at which the female and male rotors 12 and 11 first engage with each other.

As seen in FIG. 7, the respective notations have the following definitions.

$l_{MF}$: Minimum distance between the female and male rotors;

$l_{MP}$: Minimum distance between the male rotor and cusp P (the crested portion of the motor chamber wall); and $l_{FP}$: Minimum distance between the female rotor and cusp P.

Shown in FIG. 8 are variation curves of the above-mentioned distances $l_{MF}$, $l_{MP}$ and $l_{FP}$ plotted against the rotor rotation angle $\phi$ or the distance in the axial direction of the rotors on the horizontal axis and the distance on the vertical axis. Plotted in FIG. 9 are smaller portions of the distances of $l_{MP}$ and $l_{MF}+l_{FP}$, in which the horizontal and vertical axes have the same meaning as in FIG. 8 and, for the convenience of illustration, the distance $l_{FP}$ is plotted on the lower side on the basis of the distance curve for $l_{MP}$. In this instance, the blow hole has an area which is circumvented by points s, t, u and v in FIG. 9. The angle $\phi_o$ is the angle where the tip end of the male rotor reaches the cusp P, and takes a certain fixed value. In the same manner as explained in connection with FIG. 6, when the position of the point B in FIG. 5 is shifted to B', the angle $\phi_B$ changes to $\phi_{B'}$ as a result shifting the distances $l_{MP}$ and $l_{FP}$ as indicated by the one-dot chain line and the points s, t, u to s', t' and u', respectively.

Accordingly, in case of the conventional tooth profile where the center of curvature of the surface of the function G(x) is located on the trailing side, the shift to $\phi_{B'}$ of the rotor rotation angle $\phi_B$, at which the female and male rotors disengage from each other, is reflected by a shortened seal line but at the same time by an increased blow hole area as a result of substantially parallel shifts of the curves st and tu of the distances $l_{MF}$ and $l_{FP}$.

On the other hand, as shown in FIG. 10, in case of an oil flooded type compressor or the like, the tooth grooves 17 and 18 of the female and male rotors 12 and 11 are sealed off from each other by oil 16 which intervenes the two rotors. The sealing effect of this oil portion 16 is enhanced as the oil pressure is generated by wedge effect which is produced according to the relative speed of the female and male rotors 12 and 11. Namely, when the relative speed of the female and male rotors 12 and 11 is zero, the oil pressure at the oil portion 16 becomes smaller, lowering the sealing effect of the oil portion 16.

Therefore, there is a problem that, when the center of curvature of the tooth surface of the function G(x) is located on the pitch circle of the female rotor, the relative speed of the male and female rotors at the seal point becomes zero, impairing the afore-mentioned sealing effect.

SUMMARY OF THE INVENTION

With the foregoing problems in view, the present invention has as its object the provision of screw rotors suitable for use in oil flooded screw compressors or the like, which permit to shorten the seal line length while suppressing the increment of the blow hole area.

In accordance with the present invention, there is provided a couple of female and male rotors for an oil flooded compressor or the like, the female rotor having a tooth of a profile containing on the trailing side thereof a first tooth surface expressed by a function f(x), generated by a tip end portion located on the trailing side of the opposing male rotor tooth and expressed by an arbitrary function F(x), and a second tooth surface expressed by a function G(x) and extending from the first tooth surface of the function f(x) to the addendum circle of the female rotor tooth, the second tooth surface being profiled in a different shape from the first tooth portion f(x) and having the center of curvature in part thereof located outward of the addendum circle of the female rotor tooth and on the anterior side thereof.

The above and other objects, features and advantages of the invention will become apparent from the following description and the appended claims, taken in conjunction with the accompanying drawings which show by way of example a preferred embodiment of the invention.

DESCRIPTION OF THE PREFERRED EMBODIMENTS

Figure 1:
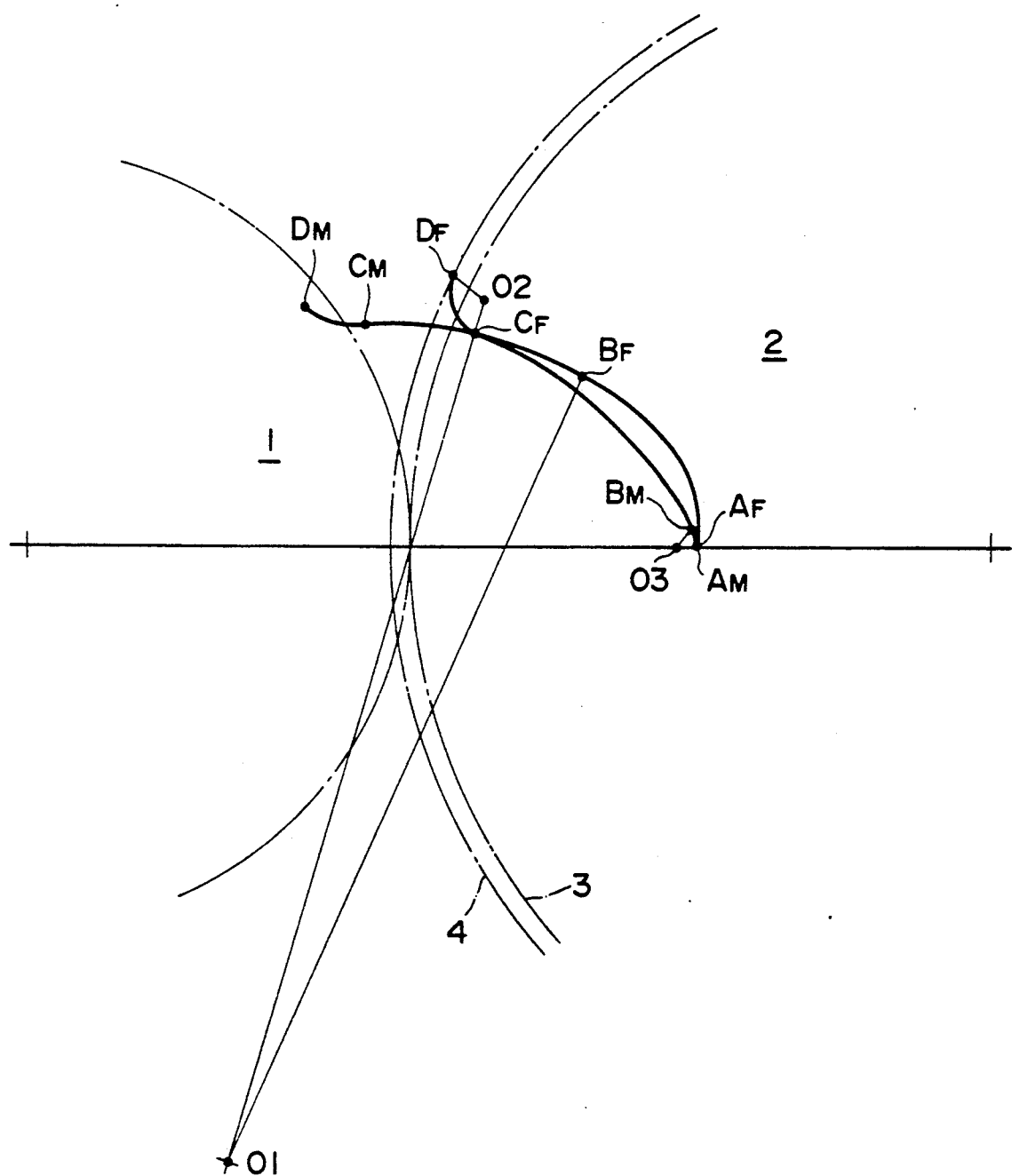
FIG. 1 is a fragmentary front view of meshed portions of screw rotors according to the present invention.

Hereafter, the invention is described more particularly by way of a preferred embodiment shown in the drawings.

Referring to FIG. 1, there are shown meshed portions on the trailing side of male and female screw rotors 1 and 2 according to the invention, which are suitable for use in an oil flooded screw compressor or the like. The tooth of the male rotor 1 is profiled to contain from its tooth top to tooth root a tooth surface between points $A_M$–$B_M$ corresponding to the function F(x), a tooth surface between points $B_M$–$C_M$ and between points $C_M$–$D_M$ correspoding to the function g(x), while the tooth of the female rotor 2 is profiled to contain from its tooth root to tooth top a tooth surface between points $A_F$–$B_F$ corresponding to the function f(x) and a tooth surface between points $B_F$–$C_F$ and between points $C_F$–$D_F$ corresponding to the function G(x), of which:

$A_M$–$B_M$: A circle having the center at $O_3$;

$B_M$–$C_M$: A curve generated by $B_F$–$C_F$ of the female rotor 2;

$C_M$–$D_M$: A curve generated by $C_F$–$D_F$ of the female rotor 2;

$A_F$–$B_F$: A curve generated by $A_M$–$B_M$ of the male rotor 1;

$B_F$–$C_F$: A circle having the center thereof located at $O_1$ anterior of $B_F$–$C_F$ relative to the direction of rotation of female rotor 2 and outward of the pitch circle 3; and $C_F$–$D_F$: A circle having the center thereof located at $O_2$ posterior of $C_F$–$D_F$ relative to the direction of rotation of female rotor 2 and $D_F$ being located on the addendum circle.

Figure 2:
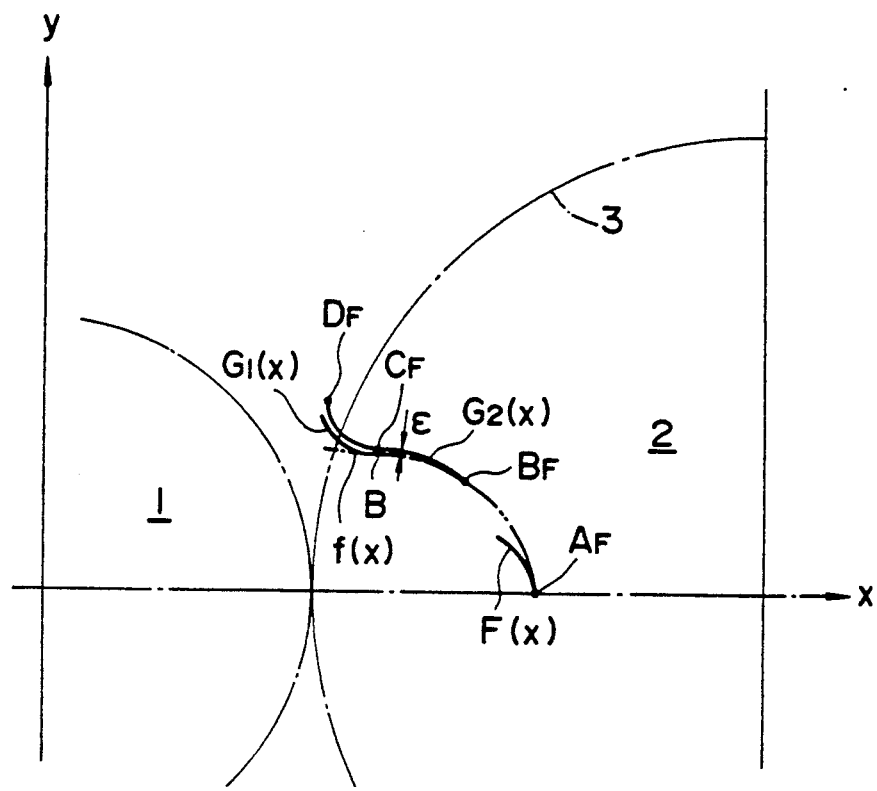
FIGS. 2 to 4 show the screw rotors of FIG. 1 in comparison with conventional counterparts by way of a fragmentary front view of the rotor tooth profiles, a diagram explanatory of a shift of seal point, and a diagram of the blow hole area, respectively.

In this regard, FIG. 2 shows the screw rotors of the invention in comparison with conventional counterparts, in which a subscript "1" is added to the functions of the tooth profiles of the coventional screw rotors while a subscript "2" is added to the functions of the tooth profiles of the screw rotors according to the invention.

Figure 3:
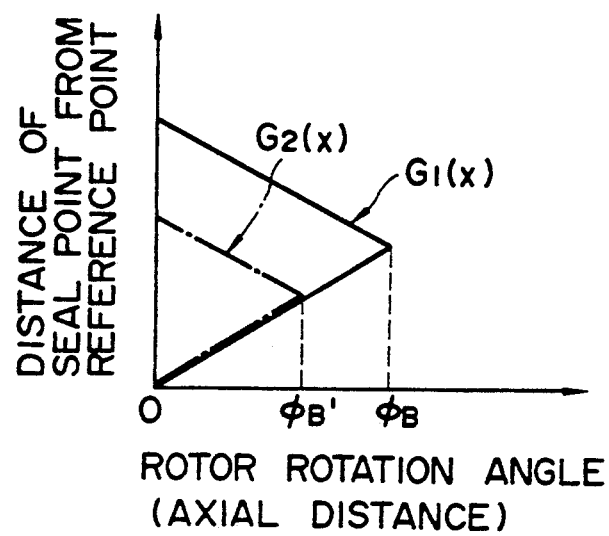
Figure 4:
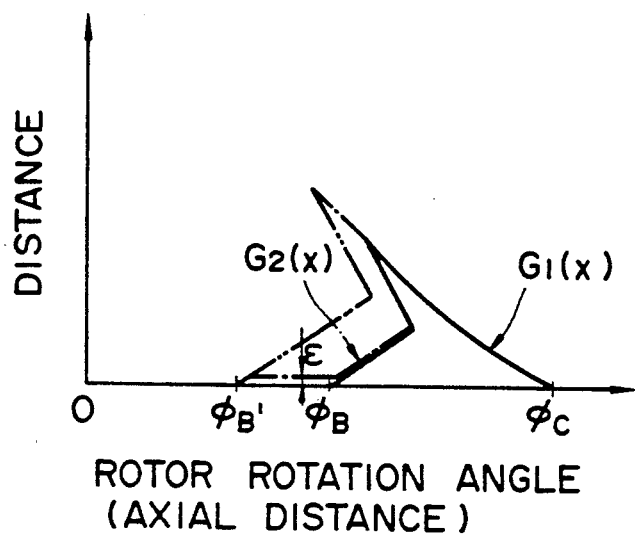
Figure 5:
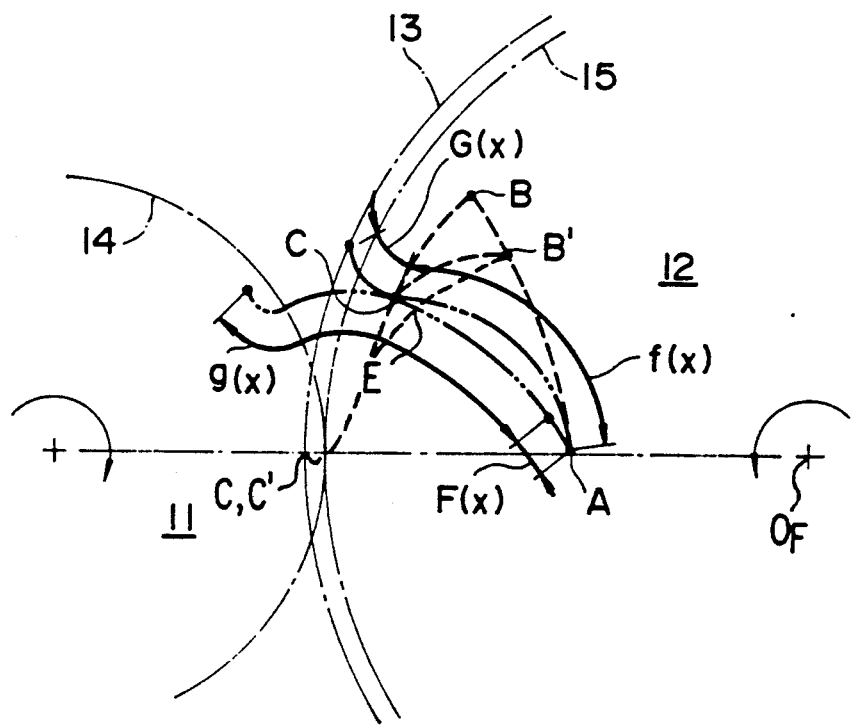
FIG. 5 is a diagrammatic illustration of meshed portions of conventional screw rotors and the loci of seal points.
Figure 6:
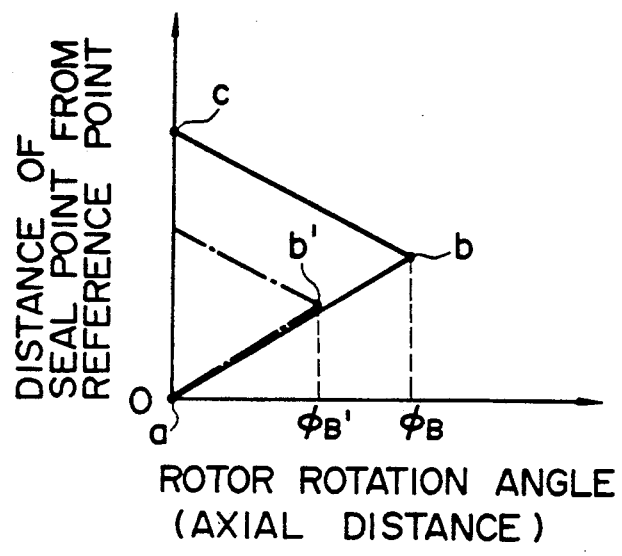
FIG. 6 is a diagram showing the rotor rotation angle or the axial distance from a reference point in relation with the distance of the seal point from the reference point.
Figure 7:
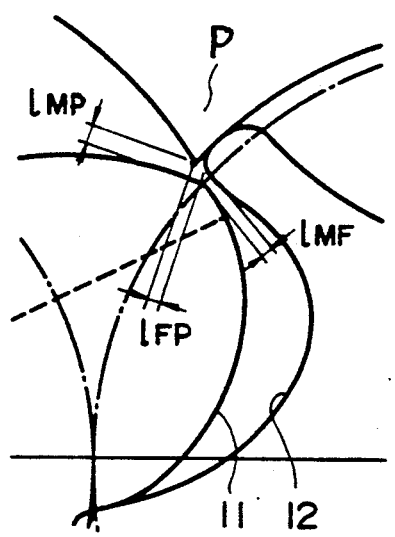
FIG. 7 is a diagrammatic front view explanatory of the distances $l_{FP}$, $l_{MF}$ and $l_{MP}$.
Figure 8:
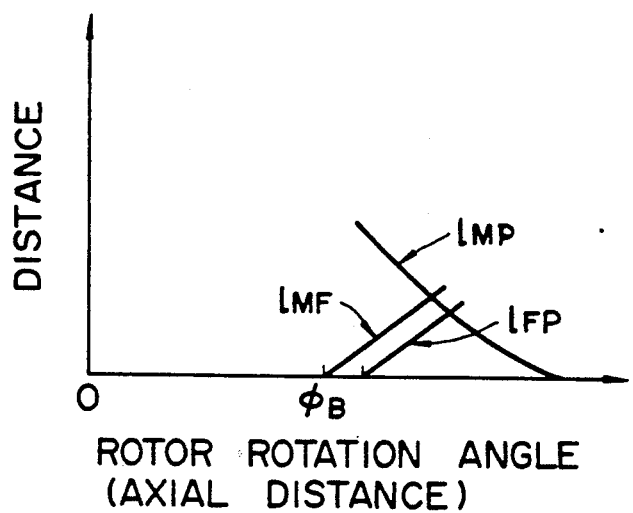
FIG. 8 is a diagram showing the rotor rotation angle or the axial distance from a reference point in relation with the distances of $l_{FP}$, $l_{MF}$ and $l_{MP}$.
Figure 9:
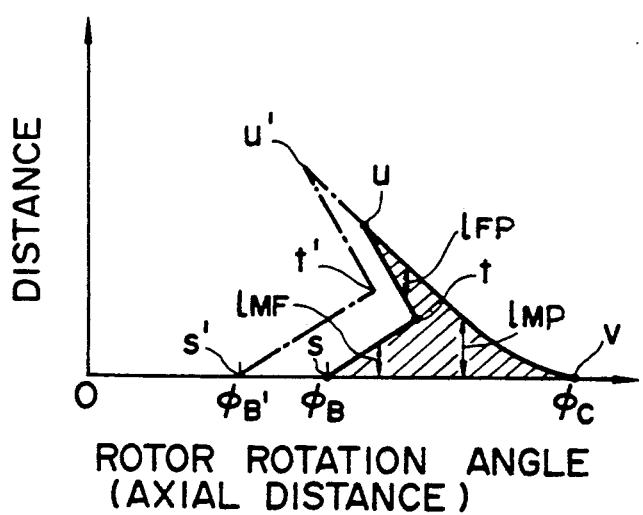
FIG. 9 is a diagram showing the rotor rotation angle or the axial distance from a reference point in relation with the smaller one of the distances $l_{MP}$ and ($l_{MF}+l_{FP}$).
Figure 10:
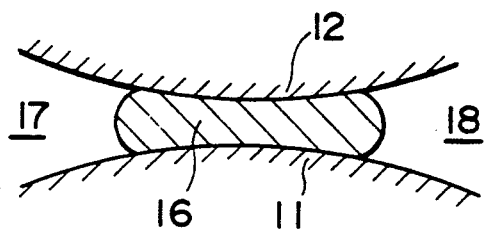

As described hereinbefore, the curve of the function $G_1(x)$ is connected to the curve of f(x) at point B. The tooth surface of the function $G_2(x)$ is connected to the tooth surface of the function f(x) at point $B_F$ which is closer to point $A_F$, and so shaped as to retain as far as point $C_F$ a small distance $\epsilon$ from the tooth surface of the function f(x), the distance $\epsilon$ being larger than the rotor clearance. The tooth surface $C_F$–$D_F$ has a shape similar to that of the tooth surface of the function $G_1(x)$. Consequently, as shown in FIG. 3, the seal line becomes shorter in case of the tooth surface of the function $G_2(x)$ than the tooth surface of the function $G_1(x)$. On the other hand, as shown in FIG. 4, the blow hole area becomes larger in case of the tooth surface of the function $G_2(x)$ than the tooth surface of the function $G_1(x)$. However, the distance $l_{MF}$ between the rotor rotation angles $\phi_{B'}$ and $\phi_B$ is $\epsilon$, so that the area of this portion is small enough compared with the whole area. The center of curvature of the tooth surface f(x) is always located anterior of that portion, so that the distance $\epsilon$ can be minimized to a sufficient degree by the anterior location of the center of curvature of the tooth surface $B_F$–$C_F$ of the function of $G_2(x)$.

Namely, with the screw rotors according to the invention, the length of the seal line is shortened while suppressing the increment of the blow hole area to a sufficient degree.

Further, the center of the curvature of the tooth surface between points $B_F$ and $C_F$ is located on the outer side of the pitch circle 3, a relative speed occurs between the male and female rotors 1 and 2, as a result generating an oil pressure in the oil between the male and female rotors 1 and 2 to form a seal of good condition.

As clear from the foregoing description, in the screw rotors according to the present invention, the female rotor tooth is shaped to have a profile containing on the trailing side thereof a first tooth surface expressed by a function f(x), generated by a tip end on the posterior side of a male rotor tooth expressed by an arbitrary function F(x), and a second tooth surface expressed by a function G(x) extending from the first tooth surface to the addendum circle of the female rotor tooth, the second tooth surface being formed in a shape different from the first tooth surface of f(x) and having the center of curvature in part thereof located outward of the pitch circle of the female rotor tooth on the anterior side thereof.

Therefore, the seal line length can be shortened without entailing an unduly large increment of the blow hole area, for the purpose of enhancing performance quality of a screw compressor or the like.

Further, since the above-mentioned center of curvature on the anterior side is located outward of the pitch circle, a relative speed is produced between the female and male rotors at the tooth surface of the function G(x), as a result generating an oil pressure which contributes to improve the seal characteristics and the performance quality of a screw compressor or the like.

What is claimed is:

1. A tooth profile for the trailing side of a female rotor tooth for an oil flooded compressor or the like, said tooth profile comprising:

a first tooth surface expressed by a function f(x), generated by a tip end portion located on the trailing side of an opposing male rotor tooth and expressed by an arbitrary function F(x), and a second tooth surface expressed by a function G(x) and extending from said first tooth surface of the function f(x) to an addendum circle of said female rotor tooth, said second tooth surface being profiled in a different shape from said first tooth surface f(x), and said second tooth surface having a portion with a center of curvature located outward of the addendum circle of said female rotor tooth and on an anterior side of said tooth profile.

* * * * *